(12) United States Patent
Fischer et al.

(10) Patent No.: US 9,656,750 B2
(45) Date of Patent: May 23, 2017

(54) VEHICLE CARGO COMPARTMENT, SYSTEM AND VEHICLE

(71) Applicant: Airbus Operations GmbH, Hamburg (DE)

(72) Inventors: Dennis Fischer, Hamburg (DE); Stephan Kahle, Hamburg (DE)

(73) Assignee: Airbus Operations GmbH, Hamburg (DE)

( * ) Notice: Subject to any disclaimer, the term of this patent is extended or adjusted under 35 U.S.C. 154(b) by 113 days.

(21) Appl. No.: 14/602,834

(22) Filed: Jan. 22, 2015

(65) Prior Publication Data
US 2015/0210391 A1 Jul. 30, 2015

(30) Foreign Application Priority Data

Jan. 27, 2014 (EP) .................................... 14152741

(51) Int. Cl.
| | | |
|---|---|---|
| *B64D 9/00* | (2006.01) | |
| *B60P 7/13* | (2006.01) | |
| *B63B 25/00* | (2006.01) | |

(52) U.S. Cl.
CPC .............. *B64D 9/00* (2013.01); *B63B 25/004* (2013.01); *B64D 9/003* (2013.01); *B60P 7/13* (2013.01)

(58) Field of Classification Search
CPC .... B64D 9/00; B64D 9/003; B64D 2009/006; B60P 7/13; B60P 7/0815; B60P 7/08; B60P 7/0807
See application file for complete search history.

(56) References Cited

U.S. PATENT DOCUMENTS

| | | | | |
|---|---|---|---|---|
| 3,741,504 A | * | 6/1973 | Alberti .................. | B64D 9/003 198/436 |
| 3,986,460 A | * | 10/1976 | Voigt ..................... | B64D 9/003 244/137.1 |
| 4,234,278 A | * | 11/1980 | Harshman ................ | B60P 7/13 244/118.1 |
| 5,950,964 A | * | 9/1999 | Saggio ..................... | B64C 1/20 244/118.1 |

(Continued)

FOREIGN PATENT DOCUMENTS

| | | |
|---|---|---|
| DE | 10 2010 035099 | 2/2012 |
| EP | 0541928 | 5/1993 |

OTHER PUBLICATIONS

European Search Report, Jul. 9, 2014.

*Primary Examiner* — Justin Larson
(74) *Attorney, Agent, or Firm* — Greer, Burns & Crain Ltd.

(57) ABSTRACT

A vehicle cargo compartment, comprising a housing receivable in a vehicle, and at least one latch mounted to the housing for locking a cargo unit in a fixed position. The latch comprises a latch housing mounted to the housing, and at least a first latch claw moveably mounted to the latch housing moveable between a latched and an unlatched position. A latch sensor system comprises a position sensor and a target, the position sensor adapted to detect and generate a latch signal when the target is in the predetermined position. The vehicle cargo compartment can be monitored easily and reliably when the first latch claw is in the latched position due to the position sensor and the target being arranged and adapted such that the predetermined position of the target is detected and the latch signal is generated, when the first latch claw is in the latched position.

15 Claims, 2 Drawing Sheets

(56) References Cited

U.S. PATENT DOCUMENTS

| | | | |
|---|---|---|---|
| 6,002,350 A | 12/1999 | Checa et al. | |
| 6,413,029 B1 * | 7/2002 | Kernkamp | B64D 9/003 410/77 |
| 6,485,238 B2 * | 11/2002 | Segura | B64D 9/003 410/69 |
| 6,488,457 B2 * | 12/2002 | Diamante | B64D 11/0696 410/46 |
| 6,517,028 B2 * | 2/2003 | Huber | B64D 9/00 244/118.1 |
| 6,557,800 B2 * | 5/2003 | Medina | B64D 9/00 193/35 R |
| 7,003,374 B2 * | 2/2006 | Olin | B64C 1/20 244/118.1 |
| 7,758,290 B2 * | 7/2010 | Boggenstall | B60P 7/13 244/118.1 |
| 8,690,103 B2 * | 4/2014 | Schulze | B64C 1/20 244/118.1 |
| 8,788,085 B2 * | 7/2014 | Panzram | B64D 9/00 700/213 |
| 8,821,088 B2 * | 9/2014 | Roberts | B64D 9/003 410/69 |
| 9,238,504 B2 * | 1/2016 | Huber | B64C 1/20 |
| 9,340,286 B2 * | 5/2016 | Panzram | B64D 9/00 |
| 9,376,210 B2 * | 6/2016 | Lohmann | B60P 7/0892 |
| 9,382,004 B2 * | 7/2016 | Huber | B64D 9/00 |
| 2011/0313563 A1 * | 12/2011 | Huber | G06Q 10/08 700/214 |
| 2012/0312920 A1 | 12/2012 | Huber et al. | |
| 2013/0166063 A1 | 6/2013 | Panzram et al. | |
| 2013/0297065 A1 * | 11/2013 | Huber | B64C 1/22 700/230 |
| 2014/0367515 A1 * | 12/2014 | Lohmann | B60P 7/0892 244/118.1 |
| 2015/0210391 A1 * | 7/2015 | Fischer | B64D 9/00 224/401 |

* cited by examiner

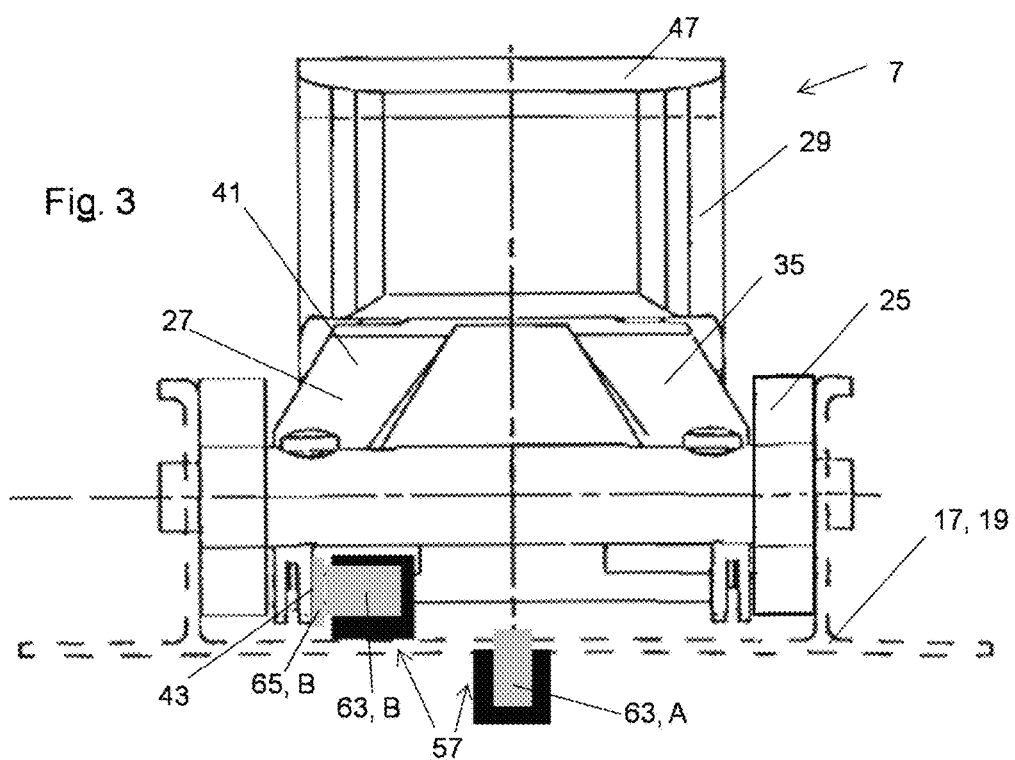

VEHICLE CARGO COMPARTMENT, SYSTEM AND VEHICLE

CROSS-REFERENCES TO RELATED APPLICATIONS

This application claims the benefit of the European patent application No. 14152741.6 filed on Jan. 27, 2014, the entire disclosures of which are incorporated herein by way of reference.

BACKGROUND OF THE INVENTION

The present invention relates to a vehicle cargo compartment, in particular an aircraft cargo compartment. Further aspects of the invention relate to a system of such a vehicle cargo compartment and at least one cargo unit received in said vehicle cargo compartment, as well as to a vehicle, in particular an aircraft, comprising such a vehicle cargo compartment.

The vehicle cargo compartment comprises a compartment housing and at least one latch device. The compartment housing is adapted for being received in a vehicle, in particular in an aircraft fuselage. The latch device is mounted to said compartment housing and adapted for locking a cargo unit received in said vehicle cargo compartment, in a fixed and predetermined position with respect to said compartment housing. Said cargo unit may be e.g., a "Unit Load Device" (ULD) commonly used for loading of an aircraft and in the form of a container or a pallet.

Said latch device comprises a latch housing mounted to said compartment housing, and at least a first latch claw moveably mounted to said latch housing. Said first latch claw is moveable, preferably pivotable, between a latched position, where the first latch claw is adapted to engage a corresponding engagement section on a cargo unit received in the vehicle cargo compartment, and an unlatched position, where the first latch claw is adapted to disengage from said engagement section.

Further, a latch sensor system is provided comprising a position sensor and a target element, said position sensor being adapted for detecting a predetermined position of the target element and generating a latch signal when the target element is in said predetermined position. The position sensor preferably is a magnetic proximity sensor and the target element preferably comprises a ferromagnetic metal material.

One of the position sensor and the target element is mounted to the first latch claw and the other one of the position sensor and the target element is mounted alternatively either to the latch housing, to the compartment housing, or to a second latch claw which is moveably mounted to the latch housing.

Such vehicle cargo compartments are known in the art of aircraft cargo systems. The known latch sensor system, i.e. the position sensor and the target element are positioned and adapted in such a manner that the position sensor detects the position of the target element and generates a latch signal, when the first latch claw and the second latch claw are in the unlatched position. In such a way, when it is detected that the latch claws are in the unlatched position a roller drive can be initiated driving one or more rollers installed on the compartment housing in a rotating manner, said rollers in turn engaging the outer surface of a cargo unit, thereby moving said cargo unit along the compartment housing without the cargo unit being restrained by the latch claws. However, with the arrangement of the latch sensor system known in the art it is merely possible to reliably detect when the latch claws are in the unlatched position.

In connection with the vehicle cargo compartments known in the art, after completing the process of loading the cargo compartment with cargo units the loadmaster has to verify that each cargo unit is properly latched in its intended position in the compartment, so that it does not move during the flight. Such verifying is carried out manually, i.e. the loadmaster has to sight check each single latch device and each single cargo unit. This process takes a long time and at some particular aircraft types is very difficult to be handled, as their cargo compartments do not provide much space for the loadmaster to move along.

SUMMARY OF THE INVENTION

Therefore, an object of the present invention is to provide a vehicle cargo compartment, where it can be monitored easily and reliably when the first latch claw is in the latched position.

This object is achieved by the position sensor and the target element being arranged and adapted, in particular the position sensor is calibrated, in such a manner that the predetermined position of the target element is detected and the latch signal is generated, when the first latch claw is in the latched position.

There are several possible options for the position sensor and the target element to be positioned on the first latch claw, the latch housing, or the compartment housing. One of the position sensor and the target element always has to be positioned on the first latch claw and the other one of the position sensor and the target element has to be positioned on one of the parts in relation to which the first latch claw can be moved, i.e. the latch housing and the compartment housing. Based on these positions of the position sensor and the target element with respect to one another the position sensor has to be directed to the position of the target element and configured to detect the target element in such cases, when the first latch claw with one of the position sensor and the target element attached thereto is moved to the latched position relative to either the latch housing or the compartment housing with the other one of the position sensor and the target element attached thereto.

In such a manner when the first latch claw is in the latched position the latch signal is generated and provided to the loadmaster, e.g., by means of a simple lamp or an optical display device indicating that either one or all latch claws in the cargo compartment are in the latched position. The loadmaster does not need to sight check each latch device himself but can rely on the latch signal provided to him e.g., on the display device. The process of monitoring the latch status after loading the cargo compartment becomes considerably faster, easier, and more reliable in such a way. Further, it takes responsibility off the loadmaster.

According to a preferred embodiment, the position sensor is arranged on the compartment housing and the target element is arranged on the first latch claw. In such a manner the position sensor may be arranged opposite the target element when the first latch claw is in the latched position, and no cables need to be installed on the moveable first latch claw. The positions of the position sensor and the target element may also be reversed.

According to an alternative embodiment, the position sensor is arranged on the latch housing and the target element is arranged on the first latch claw. In such a manner the position sensor may be arranged opposite the target element when the first latch claw is in the latched position, and no cables need to be installed on the moveable first latch claw. The positions of the position sensor and the target element may also be reversed.

According to another alternative embodiment, the position sensor is arranged on the first latch claw and the target element is arranged on the second latch claw. The second latch claw may be formed and configured in correspondence with the first latch claw, but may be moved in opposite direction so that the position sensor faces the target element when both first and second latch claws are in the latched position. In such a manner the latched position not only of the first latch claw but also of the second latch claw may be detected simultaneously. The positions of the position sensor and the target element may also be reversed.

In a preferred embodiment the compartment housing comprises a housing floor and two opposite housing side walls at least partially surrounding a compartment interior space. The housing floor has an inner surface facing the compartment interior space. On said inner surface of the housing floor a roller track is provided extending in parallel to said housing side walls. The roller track comprises a track housing and a plurality of rollers rotatably mounted to said track housing. Each roller has an axis of rotation extending perpendicularly with respect to the direction of extension of the roller track. The rollers are adapted to engage a lower surface of a cargo unit received in said vehicle cargo compartment. The cargo units may easily be slid on the rollers through the vehicle cargo compartment. At least a share of said rollers are driven by a roller drive in order to transport a cargo unit inside of the vehicle cargo compartment.

In particular, it is preferred that the latch device is mounted to the track housing of the roller track between two subsequent rollers in such a manner that the first latch claw, when in the latched position, projects up over the level in which the rollers are adapted to engage the lower surface of a cargo unit, and when in the unlatched position, is retracted under the level in which the rollers are adapted to engage the lower surface of a cargo unit. A plurality of latch devices may be mounted to the track housing in preferably constant distances representing the desired positions of the cargo units intended to be received in the cargo compartment. In such a way a cargo unit may be slid over the rollers along the roller track, while the latch claws of the latch devices are in the unlatched position. When the desired position of the cargo unit is reached, the first latch claw is moved in the latched position engaging the corresponding engagement section on said cargo unit so as to lock the cargo unit in its position.

Further, it is preferred that the first latch claw comprises a first claw arm and a first claw head connected to said first claw arm and adapted to engage a corresponding engagement section on a cargo unit received in the vehicle cargo compartment. The first claw arm is mounted to the latch housing pivotally by means of a first hinge. An axis of rotation of said first hinge being parallel to the axes of rotation of the rollers in the roller track. The first claw arm comprises an inner first arm section extending between the first hinge and the first claw head, and an outer first arm section extending away from the first hinge on that side of the first hinge opposite from the inner first arm section. In such a manner the first latch claw can be easily pivoted between latched and unlatched positions in the roller track.

In a preferred embodiment, the position sensor is mounted to the track housing underneath the latch device. In particular, it is preferred that the position sensor is directed upwards away from the housing floor, and that the target element is mounted to the inner first arm section of the first claw arm. In such a manner, the latched position of the first latch claw can be detected precisely and in a simple way.

Alternatively, it is preferred that the position sensor is directed in parallel to the axis of rotation of the first hinge, and that the target element is mounted to the outer first arm section of the first claw arm. In such a manner, the latched position of the first latch claw can be detected precisely and in a simple way.

In a preferred embodiment, the second latch claw comprises a second claw arm and a second claw head connected to said second claw arm and adapted to engage a corresponding engagement section on a cargo unit received in the vehicle cargo compartment. The second claw arm is mounted to the latch housing pivotally by means of a second hinge, an axis of rotation of said second hinge being parallel to the axis of rotation of the first hinge. The second claw arm comprises an inner second arm section extending between the second hinge and the second claw head, and an outer second arm section extending away from the second hinge on that side of the second hinge opposite from the inner second arm section. The movement of the first latch claw and the second latch claw may be coupled, e.g., by means of a gear, or by a spring element biased between outer first arm section and outer second arm section in order to urge the first and second latch claws in the latched position. The positions or the forms of the first latch claw and the second latch claw may also be exchanged. By means of two separate latch claws engaging the cargo unit movement of said cargo unit in both opposite directions of the roller track can be inhibited.

In particular, it is preferred that the first latch claw and the second latch claw are arranged such that they pivot in reverse directions of rotation, when moved between the latched position and the unlatched position. The first claw head and the second claw head are arranged opposite one another, when they are in the latched position. The position sensor is mounted to the first claw head and the target element is mounted to the second claw head, such that the position sensor is facing the target element when the first and second latch claws are in the latched position. In such a manner the latched position of the first latch claw as well as of the second latch claw can be detected at the same time. Of course, the position of the position sensor and the target element may also be exchanged, so that the position sensor is mounted to the second claw head and the target element is mounted to the first claw head.

According to a further preferred embodiment, a latch status display device is provided, said latch status display device being adapted to receive the latch signal generated by the position sensor and to display an optical sign indicating that the first and/or second latch claw is in the latched position. The latch status display device can be arranged in the vehicle cargo compartment or outside of the vehicle cargo compartment, so that the loadmaster can monitor the status of the latch devices, i.e., whether all latch claws are in the latched position. Additionally, a latch status display device may be provided in the cockpit for the pilot crew to monitor the latch status. The latch status display device in the simplest case may be a single lamp which is associated to each latch device, wherein a light shining in a lamp corresponds to the first latch claw of the associated latch device being in the latched position or in the unlatched position, respectively.

Alternatively, a latch controller unit may be interconnected, wherein the latch signals of all latch devices are fed into the latch controller unit, which in turn may process these latch signals and may on the latch status display device provide a status of all latch devices including an indication of the exact latch device which is not latched. Alternatively, the operation of one or more systems of an aircraft comprising said vehicle cargo compartment may be inhibited by the latch controller unit, when it is detected that one of the latch claws is not in the latched position. The latch status display device may also be formed as or included in a mobile device connected to the latch controller unit by a wireless data connection.

Further aspects of the invention concern a system of a vehicle cargo compartment as described before and at least one cargo unit received in said vehicle cargo compartment, as well as a vehicle, in particular an aircraft, comprising a vehicle cargo compartment as described above. The characteristics and advantages described before in connection with the vehicle cargo compartment also apply for said system and vehicle.

BRIEF DESCRIPTION OF THE DRAWINGS

In the following a preferred embodiment of the present invention is described by means of a drawing. The drawing shows in FIG. 1 a perspective view of a vehicle cargo compartment according to the present invention, comprising a plurality of latch devices, FIG. 2 a cross sectional view of a latch device installed in the vehicle cargo compartment of FIG. 1, the section plane extending in parallel to the direction of extension of the roller track, and FIG. 3 a cross sectional view of a latch device installed in the vehicle cargo compartment of FIG. 1, the section plane extending perpendicularly to the direction of extension of the roller track.

DETAILED DESCRIPTION OF THE PREFERRED EMBODIMENTS

Figure 1:
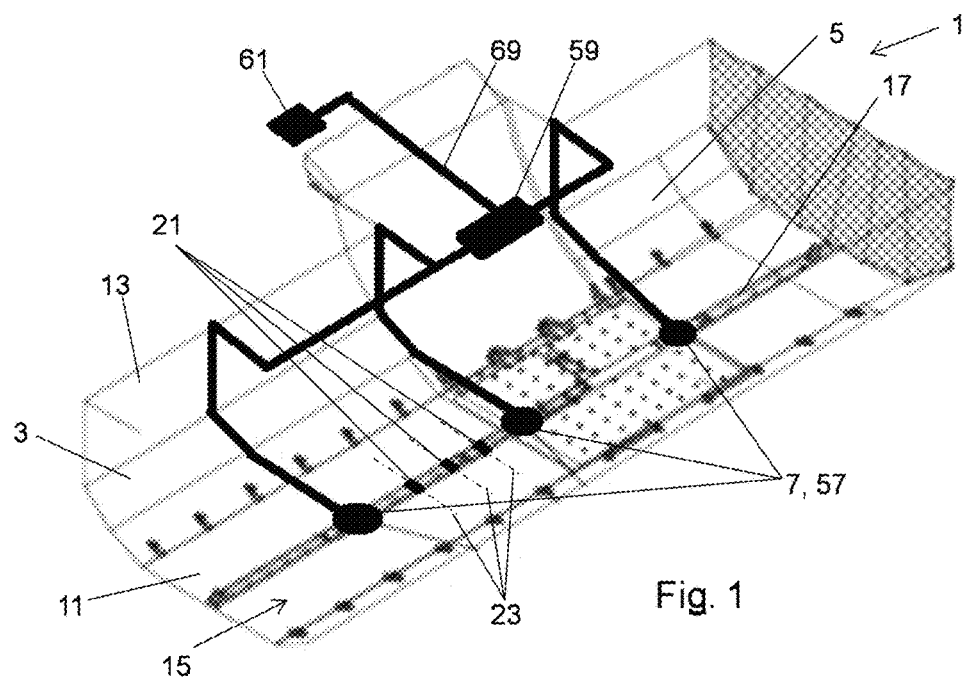

In FIG. 1 a preferred embodiment of the vehicle cargo compartment 1, in the present case an aircraft cargo compartment, according to the present invention is shown. Said vehicle cargo compartment 1 comprises a compartment housing 3 surrounding a compartment interior space 5, and a plurality of latch devices 7 mounted to said compartment housing 3 in order to latch a plurality of cargo units (not shown) received in said vehicle cargo compartment 1, in predetermined positions.

The compartment housing 3 comprises a housing floor 11 and two opposite housing side walls 13 extending upwards from said housing floor 11. The housing floor 11 has an inner surface 15 facing the compartment interior space 5. On said inner surface 15 of the housing floor 11 a roller track 17 is provided extending in parallel to the housing side walls 13 along the housing floor 11. Said roller track 17 comprises a track housing 19 and a plurality of rollers 21 rotatably mounted to said track housing 19 in such a manner that the axes of rotation 23 of said rollers 21 extend perpendicularly with respect to the direction of extension of the roller track 17 and with respect to the housing side walls 13. The rollers 21 are arranged and adapted such that they engage a lower surface of a cargo unit (not shown) received in said vehicle cargo compartment 1 in order for the cargo unit to be slid over the rollers 21 along the roller track 17.

Figure 2:
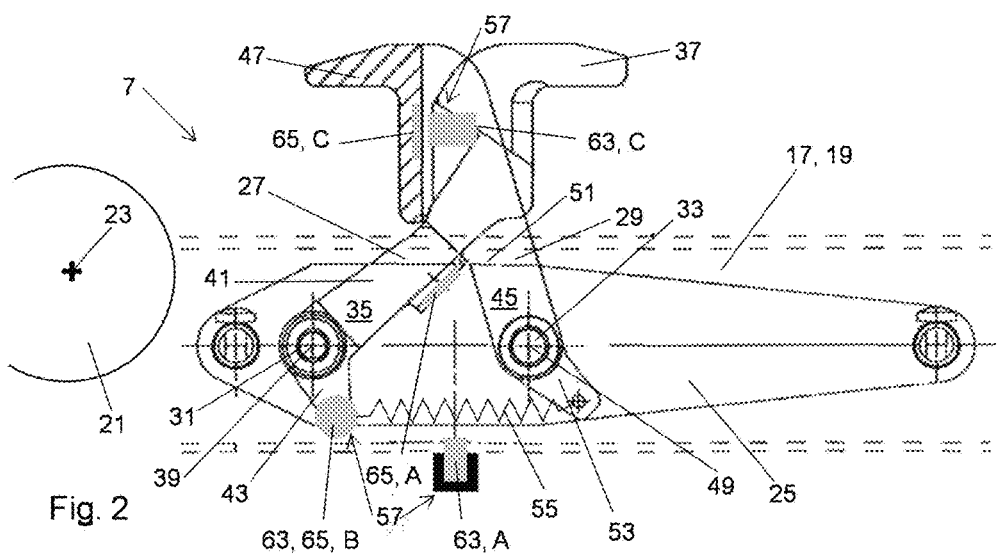

The latch devices 7, which are detailed shown in FIGS. 2 and 3, each comprise a latch housing 25 mounted to the track housing 19 of the roller track 17 between two subsequent rollers 21, as well as a first latch claw 27 and a second latch claw 29 pivotably mounted to the latch housing 25 by means of a first hinge 31 and a second hinge 33. Each latch claw 27, 29 is pivotable between a latched position (see FIG. 2) and an unlatched position, wherein in the latched position the latch claws 27, 29 are adapted to engage a corresponding engagement section on the lower surface of a cargo unit received in the vehicle cargo compartment 1, and in the unlatched position the latch claws 27, 29 are adapted to disengage from said engagement section. When first and second latch claws 27, 29 are in the latched position they project up over the level of the roller track 17 in which the rollers 21 are adapted to engage the lower surface of a cargo unit, thereby inhibiting the cargo units from being moved along the rollers 21 of the roller track 17. When first and second latch claws 27, 29 are in the unlatched position they are retracted under the level of the roller track 17 in which the rollers 21 are adapted to engage the lower surface of a cargo unit, so that they do not inhibit the cargo units from being moved along the rollers 21.

First and second latch claws 27, 29 are formed correspondingly. The first latch claw 27 comprises a first claw arm 35 and a first claw head 37 connected to said first claw arm 35 and adapted to engage the corresponding engagement section on a cargo unit received in the vehicle cargo compartment 1. The first claw arm 35 is mounted to the latch housing 25 pivotally by means of the first hinge 31, wherein an axis of rotation 39 of said first hinge 31 is parallel to the axes of rotation 23 of the rollers 21 in the roller track 17. The first claw arm 35 comprises an inner first arm section 41 extending between the first hinge 31 and the first claw head 37, and an outer first arm section 43 extending away from the first hinge 31 on that side of the first hinge 31 opposite from the inner first arm section 41.

The second latch claw 29 comprises a second claw arm 45 and a second claw head 47 connected to said second claw arm 45 and adapted to engage the corresponding engagement section on a cargo unit received in the vehicle cargo compartment 1. The second claw arm 45 is mounted to the latch housing 25 pivotally by means of the second hinge 33, wherein an axis of rotation 49 of said second hinge 33 is parallel to the axis of rotation 39 of the first hinge 31. The second claw arm 45 comprises an inner second arm section 51 extending between the second hinge 33 and the second claw head 47, and an outer second arm section 53 extending away from the second hinge 33 on that side of the second hinge 33 opposite from the inner second arm section 51.

The first latch claw 27 and the second latch claw 29 are arranged in such a manner that they pivot in reverse directions of rotation, when moved between the latched position and the unlatched position, so that the first claw head 37 and the second claw head 47 are arranged opposite to one another, when first and second latch claws 27, 29 are in the latched position, in order to effectively lock a cargo unit engaged by said latch claws 27, 29, i.e. inhibit a movement of said cargo unit to both opposite directions of the roller track 17. The first latch claw 27 and the second latch claw 29 are coupled by means of a spring element 55 connecting the outer first arm section 43 and the outer second arm section 53 in such a manner that it is biased, when first and second latch claws 27, 29 are in the unlatched position, urging first and second latch claws 27, 29 into the latched position.

Further, as shown in FIG. 1, the vehicle cargo compartment 1 on each latch device 7 comprises a latch sensor system 57 in order to detect, whether the latch claws 27, 29 are in the latched position, and to provided the position status of the latch claws 27, 29, e.g., to the loadmaster of the aircraft, by means of a latch controller unit 59 and a latch status display device 61. Said latch sensor system 57 comprises a position sensor 63 and a target element 65, wherein said position sensor 63 is adapted for detecting a predetermined position of the target element 65 and generating a latch signal 67 when the target element 65 is in said predetermined position. The position sensor 63 in the described embodiment is formed as a magnetic proximity sensor, and the target element 65 is formed as a ferromagnetic metal piece.

As shown in FIGS. 2 and 3, the position sensor 63 and the target element 65 may be arranged in several possible positions on the latch device 7, so as to detect when the latch claws 27, 29 are in the latched position. Generally, one of the position sensor 63 and the target element 65 is mounted to the first latch claw 27 and the other one of the position sensor 63 and the target element 65 is mounted to the latch housing 25, to the compartment housing 3, or to the second latch claw 29. In the described embodiment, three alternative positions of the position sensor 63 and the target element 65 are indicated.

According to the first alternative position A, the position sensor 63 is mounted to the track housing 19 of the roller track 17 underneath the latch device 7 in such a way that it is directed upwards away from the housing floor 11, and the target element 65 is mounted to the inner first arm section 41 of the first claw arm 35.

According to the second alternative position B, the position sensor 63 is mounted to the track housing 19 of the roller track 17 underneath the latch device 7 in such a way that it is directed in parallel to the axis of rotation 39 of the first hinge 31, and the target element 65 is mounted to the outer first arm section 43 of the first claw arm 35.

According to the third alternative position C, the position sensor 63 is mounted to the first claw head 37 and the target element 65 is mounted to the second claw head 47, such that the position sensor 63 is facing the target element 65 when the first and second latch claws 27, 29 are in the latched position.

Whichever of the before described alternative positions A, B, C is chosen, according to the present invention the position sensor 63 and the target element 65 are arranged and adapted, i.e. the position sensor 63 has to be calibrated, in such a manner that the predetermined position of the target element 65 is detected and the latch signal 67 is generated, when the first latch claw 27 is in the latched position. In such a way it can be detected easily and reliably, whether the latch claws 27, 29 are in the latched position.

The latch signals 67 generated by the position sensors 63 of all latch devices 7 of the described vehicle cargo compartment 1 are fed into the latch controller unit 59 which processes said latch signals 67 and provides a control signal 69 to the latch status display device 61 causing the latch status display device 61 to display a sign, e.g., to the loadmaster, indicating that the latch claws 27, 29 of all latch devices 7 are in the latched position.

As is apparent from the foregoing specification, the invention is susceptible of being embodied with various alterations and modifications which may differ particularly from those that have been described in the preceding specification and description. It should be understood that I wish to embody within the scope of the patent warranted hereon all such modifications as reasonably and properly come within the scope of my contribution to the art.

The invention claimed is:

1. A vehicle cargo compartment, comprising:
   a compartment housing adapted for being received in a vehicle,
   at least one latch device mounted to said compartment housing and adapted for locking a cargo unit received in said vehicle cargo compartment, in a fixed position with respect to said compartment housing,
   said latch device comprising a latch housing mounted to said compartment housing, and at least a first latch claw moveably mounted to said latch housing,
   said first latch claw being moveable between a latched position, where the first latch claw is adapted to engage a corresponding engagement section on a cargo unit received in the vehicle cargo compartment, and an unlatched position, where the first latch claw is adapted to disengage from said engagement section,
   a latch sensor system comprising a position sensor and a target element, said position sensor being adapted for detecting a predetermined position of the target element and generating a latch signal when the target element is in said predetermined position,
   one of the position sensor and the target element being mounted to the first latch claw and the other one of the position sensor and the target element being mounted to the latch housing, to the compartment housing, or to a second latch claw moveably mounted to the latch housing, and
   the position sensor and the target element being arranged and adapted in such a manner that the predetermined position of the target element is detected and the latch signal is generated, when the first latch claw is in the latched position.

2. A vehicle cargo compartment according to claim 1, wherein the position sensor is arranged on the compartment housing and the target element is arranged on the first latch claw.

3. A vehicle cargo compartment according to claim 1, wherein the position sensor is arranged on the latch housing and the target element is arranged on the first latch claw.

4. A vehicle cargo compartment according to claim 1, wherein the position sensor is arranged on the first latch claw and the target element is arranged on the second latch claw.

5. A vehicle cargo compartment according to claim 1, wherein the compartment housing comprises a housing floor and two opposite housing side walls surrounding a compartment interior space,
   wherein the housing floor has an inner surface facing the compartment interior space,
   wherein on said inner surface of the housing floor a roller track is provided extending in parallel to said housing side walls, and
   wherein the roller track comprises a track housing and a plurality of rollers rotatably mounted to said track housing, each roller having an axis of rotation extending perpendicularly with respect to the direction of extension of the roller track, and being adapted to engage a lower surface of a cargo unit received in said vehicle cargo compartment.

6. A vehicle cargo compartment according to claim 5, wherein the latch device is mounted to the track housing of the roller track between two subsequent rollers in such a manner that the first latch claw,
   when in the latched position, projects up over the level in which the rollers are adapted to engage the lower surface of a cargo unit, and
   when in the unlatched position, is retracted under the level in which the rollers are adapted to engage the lower surface of a cargo unit.

7. A vehicle cargo compartment according to claim 5, wherein the first latch claw comprises a first claw arm and a first claw head connected to said first claw arm and adapted to engage a corresponding engagement section on a cargo unit received in the vehicle cargo compartment,
wherein the first claw arm is mounted to the latch housing pivotally by means of a first hinge, an axis of rotation of said first hinge being parallel to the axes of rotation of the rollers in the roller track,
wherein the first claw arm comprises an inner first arm section extending between the first hinge and the first claw head, and an outer first arm section extending away from the first hinge on that side of the first hinge opposite from the inner first arm section.

8. A vehicle cargo compartment according to claim 5, wherein the position sensor is arranged on the compartment housing and the target element is arranged on the first latch claw, wherein the position sensor is mounted to the track housing underneath the latch device.

9. A vehicle cargo compartment according to claim 8, wherein the first latch claw comprises a first claw arm and a first claw head connected to said first claw arm and adapted to engage a corresponding engagement section on a cargo unit received in the vehicle cargo compartment,
wherein the first claw arm is mounted to the latch housing pivotally by means of a first hinge, an axis of rotation of said first hinge being parallel to the axes of rotation of the rollers in the roller track,
wherein the first claw arm comprises an inner first arm section extending between the first hinge and the first claw head, and an outer first arm section extending away from the first hinge on that side of the first hinge opposite from the inner first arm section,
wherein the position sensor is directed upwards away from the housing floor, and
wherein the target element is mounted to the inner first arm section of the first claw arm.

10. A vehicle cargo compartment according to claim 8, wherein the first latch claw comprises a first claw arm and a first claw head connected to said first claw arm and adapted to engage a corresponding engagement section on a cargo unit received in the vehicle cargo compartment,
wherein the first claw arm is mounted to the latch housing pivotally by means of a first hinge, an axis of rotation of said first hinge being parallel to the axes of rotation of the rollers in the roller track,
wherein the first claw arm comprises an inner first arm section extending between the first hinge and the first claw head, and an outer first arm section extending away from the first hinge on that side of the first hinge opposite from the inner first arm section,
wherein the position sensor is directed in parallel to the axis of rotation of the first hinge, and
wherein the target element is mounted to the outer first arm section of the first claw arm.

11. A vehicle cargo compartment according to claim 7, wherein the position sensor is arranged on the first latch claw and the target element is arranged on the second latch claw,
wherein the second latch claw comprises a second claw arm and a second claw head connected to said second claw arm and adapted to engage a corresponding engagement section on a cargo unit received in the vehicle cargo compartment,
wherein the second claw arm is mounted to the latch housing pivotally by means of a second hinge, an axis of rotation of said second hinge being parallel to the axis of rotation of the first hinge, and
wherein the second claw arm comprises an inner second arm section extending between the second hinge and the second claw head, and an outer second arm section extending away from the second hinge on that side of the second hinge opposite from the inner second arm section.

12. A vehicle cargo compartment according to claim 11, wherein the first latch claw and the second latch claw are arranged such that they pivot in reverse directions of rotation, when moved between the latched position and the unlatched position,
wherein the first claw head and the second claw head are arranged opposite one another, when they are in the latched position, and
wherein the position sensor is mounted to the first claw head and the target element is mounted to the second claw head, such that the position sensor is facing the target element when the first and second latch claws are in the latched position.

13. A vehicle cargo compartment according to claim 1, wherein a latch status display device is provided, said latch status display device being adapted to receive the latch signal generated by the position sensor and to display a sign indicating that the first latch claw is in the latched position.

14. A system of a vehicle cargo compartment, comprising:
a compartment housing adapted for being received in a vehicle,
at least one latch device mounted to said compartment housing and adapted for locking a cargo unit received in said vehicle cargo compartment, in a fixed position with respect to said compartment housing,
said latch device comprising a latch housing mounted to said compartment housing, and at least a first latch claw moveably mounted to said latch housing,
said first latch claw being moveable between a latched position, where the first latch claw is adapted to engage a corresponding engagement section on a cargo unit received in the vehicle cargo compartment, and an unlatched position, where the first latch claw is adapted to disengage from said engagement section,
a latch sensor system comprising a position sensor and a target element, said position sensor being adapted for detecting a predetermined position of the target element and generating a latch signal when the target element is in said predetermined position,
one of the position sensor and the target element being mounted to the first latch claw and the other one of the position sensor and the target element being mounted to the latch housing, to the compartment housing, or to a second latch claw moveably mounted to the latch housing,
the position sensor and the target element being arranged and adapted in such a manner that the predetermined position of the target element is detected and the latch signal is generated, when the first latch claw is in the latched position, and
at least one cargo unit received in said vehicle cargo compartment.

15. A vehicle comprising a vehicle cargo compartment, comprising:
a compartment housing adapted for being received in the vehicle,
at least one latch device mounted to said compartment housing and adapted for locking a cargo unit received in said vehicle cargo compartment, in a fixed position with respect to said compartment housing, said latch device comprising a latch housing mounted to said compartment housing, and at least a first latch claw moveably mounted to said latch housing, said first latch claw being moveable between a latched position, where the first latch claw is adapted to engage a corresponding engagement section on a cargo unit received in the vehicle cargo compartment, and an unlatched position, where the first latch claw is adapted to disengage from said engagement section, a latch sensor system comprising a position sensor and a target element, said position sensor being adapted for detecting a predetermined position of the target element and generating a latch signal when the target element is in said predetermined position, one of the position sensor and the target element being mounted to the first latch claw and the other one of the position sensor and the target element being mounted to the latch housing, to the compartment housing, or to a second latch claw moveably mounted to the latch housing, and the position sensor and the target element being arranged and adapted in such a manner that the predetermined position of the target element is detected and the latch signal is generated, when the first latch claw is in the latched position.

\* \* \* \* \*